No. 825,460. PATENTED JULY 10, 1906.
G. HART.
GRINDING WHEEL.
APPLICATION FILED NOV. 3, 1905.
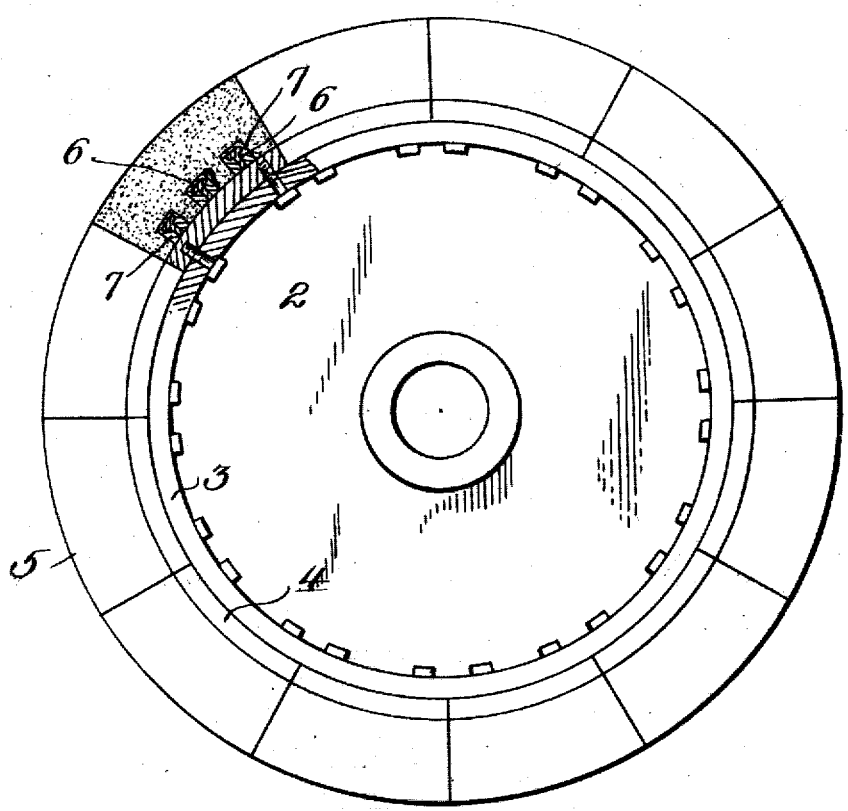
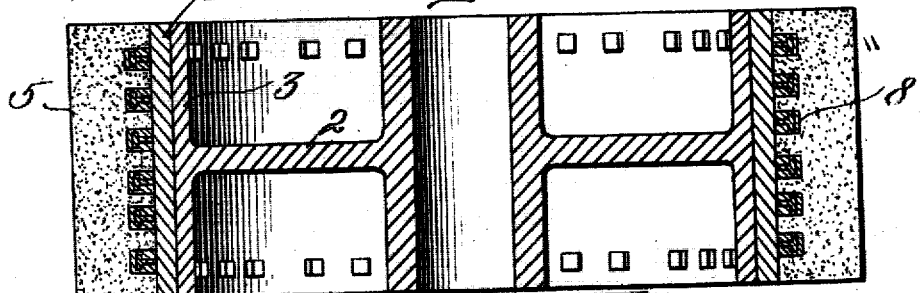
Witnesses:
Inventor
Gilbert Hart
By James L. Norris.
Atty

UNITED STATES PATENT OFFICE.

GILBERT HART, OF DETROIT, MICHIGAN.

GRINDING-WHEEL.

No 825,460.   Specification of Letters Patent.   Patented July 10, 1906.

Application filed November 3, 1905. Serial No. 285,773.

*To all whom it may concern:*

Be it known that I, GILBERT HART, a citizen of the United States, residing at Detroit, in the county of Wayne and State of Michigan, have invented new and useful Improvements in Grinding-Wheels, of which the following is a specification.

This invention relates to grinding-wheels and also to a method of making the same.

A grinding-wheel involving my invention has removable and renewable peripheral segments—such, for example, as is shown in Letters Patent No. 779,848, granted to me January 10, 1905, to which reference may be had.

The primary object of the present invention is to secure the union of grinding-segments, which are usually made from emery, to metal segments which carry them in such a way that the former cannot be cracked or broken during baking.

In the drawings accompanying and forming a part of this specification, Figure 1 is a face view of a grinding-wheel including my invention with a part of the wheel in section to better illustrate the invention. Fig. 2 is a central sectional elevation of the same. Fig. 3 is a detail view of a metal segment. Fig. 4 is a similar view of an emery or grinding segment.

Like characters refer to like parts throughout the views.

The spider for the wheel shown in the drawings is denoted by 2, and it may be made by casting, it having a wide periphery or rim, as 3, upon which are imposed the segments 4. The segments may be connected to the rim in the manner shown in the Letters Patent hereinbefore referred to or in any other desirable way. The segments are arranged in end-to-end abutting relation upon the rim or periphery 3, so as to present, in effect, a continuous structure, and each carries a grinding-segment, as 5, which I prefer to make from emery. The segments 5 are molded and are connected to the metal segment 4 by pins, as 6, and solder, as 7, the pins being ordinarily made integral with the metallic segments or plates 4. I find that if I mold the emery segments 5 directly onto the metallic plates or segments 4 without the interposition of any suitable substance between the pins 6 and the said emery segments the latter will when baked be cracked by the anchoring-pins, owing to the fact that the coefficient of expansion of the emery is different from that of the metal. I overcome this objection in an advantageous way, as will now appear.

In shaping up the segments 5 I form in them openings to receive the anchoring-pins 6, the diameter of the openings being greater than that of the pins and the solder 7 filling the spaces between the pins and the walls of the openings in which they are introduced.

After each emery segment 5 is molded or formed to the desired shape it is baked or vitrified, following which the metallic plate or segment 4 is fitted to the emery or grinding segment and the two parts clamped together. The composite segment is then set on edge and solder or cement in a fluid condition is poured through the small openings 8 in one edge of the emery segment. The openings or holes 8 intersect the pin-receiving openings in the emery segments. To prevent leakage of the cement or solder, I place clay or putty on the two ends of the composite segment and the side of said composite segment opposite the entering ends of the holes or openings 8, the clay or putty covering the joint between the metal and emery segments.

The solder or cement may be of any desirable kind, although I have found sulfur or brimstone a satisfactory medium. The metal plates may be of any desirable kind. Ordinarily they are made of malleable iron having integral pins 6, the pins being headed or upset by the blow of a hammer. The heads formed by the hammer or other implement prevent the pins from being pulled from place. The sulfur is poured into the openings 8 while in a molten condition.

Having thus described my invention, what I claim is—

1. As an article of manufacture, a grinding-segment having pin-receiving openings, a metallic plate provided with pins to enter said openings, and solder to connect the plate and segment and interposed between the pins and the segment.

2. As an article of manufacture, a grinding-segment having pin-receiving openings, a metallic plate provided with integral headed pins to enter said openings, and solder to connect the plate and segment, the diameter of the pins being greater than that of the openings, the solder surrounding the pins.

3. As an article of manufacture, a grinding-segment having pin-receiving openings, and pouring-openings extending into the same from a side edge and intersecting the other openings.

In testimony whereof I have hereunto set my hand in presence of two subscribing witnesses.

GILBERT HART.

Witnesses:
MICHAEL H. DEMPSEY.
THOMAS V. DUTTON.